April 22, 1969 R. A. KNAPP 3,440,621

COLOR CENTER INFORMATION STORAGE AND RETRIEVAL SYSTEM

Filed Feb. 11, 1966

INVENTOR
RICHARD A. KNAPP
BY Fishman and Van Kirk
ATTORNEYS

3440621
OR IN 340/173CC

United States Patent Office 3,440,621

Patented Apr. 22, 1969

3,440,621

COLOR CENTER INFORMATION STORAGE AND RETRIEVAL SYSTEM

Richard A. Knapp, Bristol, Conn., assignor to Carson Laboratories, Inc., Bristol, Conn., a corporation of Connecticut Filed Feb. 11, 1966, Ser. No. 526,870
Int. Cl. G11b 7/02
U.S. Cl. 340—173 14 Claims This invention relates to an optical memory crystal having light sensitive color centers. More particularly, this invention relates to an optical memory crystal in which ultraviolet light can be used to erase information stored in the crystal.

Crystals, such as alkali halides, having color centers, e.g., F centers, can be used as optical information storage units. Under proper conditions illumination of F centers with light of the appropriate wavelength for the particular crystal (F light) will ionize the F centers producing vacancies and F′ centers according to the relationship:

$$F+h\eta\rightarrow \text{vacancy}+F'$$

Some of these crystals also possess the characteristic that F light illumination involves the migration of vacancies and F′ centers followed by recombination into groups of three F centers known as R centers. Under certain conditions R centers are extremely stable, and this stability makes them attractive for use as information centers in memory elements. However, heretofore it was not known how to adequately erase information locally by reconversion of R centers into F centers so that portions of the crystal could be cleared and reused for storage of new information.

In the present invention a crystal containing hydrogen and in which R centers are formed by illumination with F light is used for the storage of information. This crystal is hydrogenated for its use as an information storage element, and it has been discovered that ultraviolet light can be used to erase information stored in the hydrogenated R center crystal. Thus, highly stable R center crystals can be used for information storage, and the crystals can be erased to allow storage of new information.

Accordingly, one object of the present invention is to produce a novel hydrogenated R center information storage crystal and method in which erasing can be accomplished when and where desired.

Another object of the present invention is to produce a novel hydrogenated R center information storage crystal and method in which ultraviolet light can be used as an effective source for erasing information in the crystal.

Other objects and advantages will be apparent from the specifications and drawings.

Figure 1:
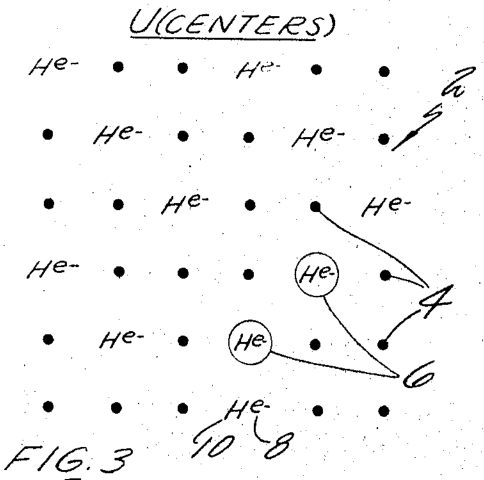
FIGURE 1 is a representation of a hydrogenated memory unit crystal.

Referring now to FIGURE 1, an alkali halide crystal 2 is represented conceptually, the alkali and halogen ions being represented by dots 4. The crystal represented in FIGURE 1 is populated with U centers 6, each U center being composed of an electron 8 and a hydrogen atom 10 located in the crystal lattice at the position of missing halogen ions.

As explained in copending application Ser. No. 453,294, filed May 5, 1965 and assigned to the assignee of this invention, to which reference is hereby made, the U centers are created by hydrogenating an F center crystal, i.e. a crystal having only electrons located at the position of missing halogen atoms. The F center crystal exhibits a characteristic color depending on the chemical composition of the crystal, but the hydrogenating to create U centers changes the absorption characteristics of the crystal from the visible range of light to the ultraviolet so that the crystal becomes bleached, i.e. transparent to F light while simultaneously becoming absorbing to U light. Thus, the crystal depicted in FIGURE 1 is a visibly transparent crystal having U centers.

Figure 2:
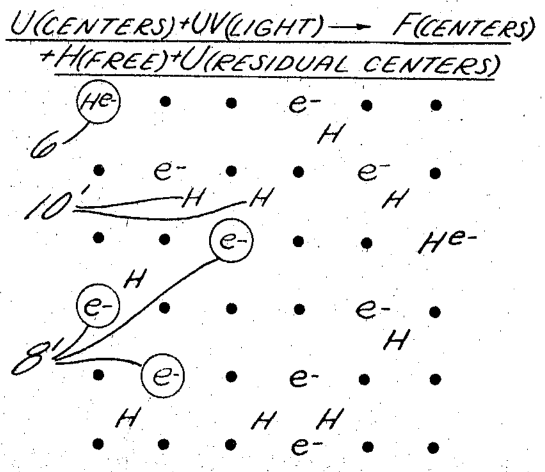
FIGURE 2 is a representation of the unit of FIGURE 1 after exposure to ultraviolet light.

In order to recolor the crystal so that information can be stored by selective illumination with F light, the entire crystal is illuminated with ultraviolet light. The resulting crystal is depicted in FIGURE 2. The ultraviolet light ejects most of the hydrogen atoms 10 from the U centers to interstitial positions 10′ so that the crystal is retransformed into a characteristically colored crystal having F centers 8′, interstitial hydrogen atoms and some residual U centers. The F centers 8′ are the electrons 8 which remain in the halogen ion vacancies after the U center hydrogen atoms are moved to interstitial positions. As indicated in the legend in FIGURE 2, the transformation in FIGURE 2 can be represented by the relationship:

$$(1)\quad U_{(\text{centers})}+\text{UV}_{(\text{light})}\rightarrow F_{(\text{centers})}+\text{Hydrogen}_{(\text{free})}+U_{(\text{residual centers})}$$

Figure 3:
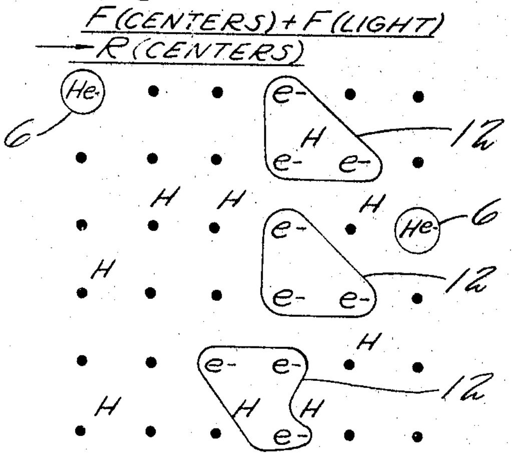
FIGURE 3 is a representation of the unit of FIGURE 2 after exposure to F light to form R centers.

Referring now to FIGURE 3, the crystal of FIGURE 2 is illuminated at selected locations with F light to cause F centers in illuminated areas to gather together in groups of three F centers which constitute R centers 12. The wavelength of F light for any particular crystal is determined by the composition of the crystal, F light being light which is absorbed by the F centers. R center characteristics are such that R centers absorb R light, light of a predetermined wavelength for the particular crystal and of predominately different wavelength than F light. Conversely, the rest of the crystal containing no R centers will transmit R light. The creation of the R centers in selective patterns constitutes storing information in the crystal. Of course, it will be understood that this discussion on a microscopic basis is for illustration only; in reality, an illuminated area would contain a multiplicity of R centers. The transformation in FIGURE 3 can be represented by the relationship:

$$(2)\quad F_{(\text{centers})}+F_{(\text{light})}\rightarrow R_{(\text{centers})}$$

Readout of stored information in FIGURE 3 crystal can be accomplished by illuminating the crystal or any desired part with R light. The R light is absorbed by the R centers, and passed by the rest of the crystal, thus generating an output from the crystal which is the negative of the stored information. The output from the crystal can, for example, be displayed on a screen. Since the R light is absorbed by the R centers and passes through the rest of the crystal without altering any part of the crystal, high intensity R light can be used for readout to generate high intensity displays.

Figure 4:
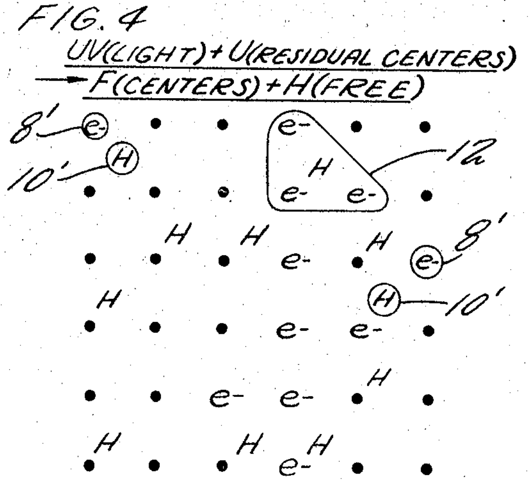
FIGURES 4, 5 and 6 are representations of the unit of RIGURE 3 after exposure to erasing ultraviolet light.

Assuming now that it is desired to erase information in all or part of the crystal, the desired area of the crystal is illuminated with ultraviolet light. Referring to FIGURE 4, the illumination of the FIGURE 3 crystal with ultraviolet light transforms residual U centers 6 in the crystal to F centers 8′ by driving the hydrogen of the U centers into interstitial positions 10′. The FIGURE 4 transformation can be expressed by the relationship:

$$(3)\quad \text{UV}_{(\text{light})}+U_{(\text{residual centers})}\rightarrow F_{(\text{centers})}+\text{Hydrogen}_{(\text{free})}$$

Figure 5:
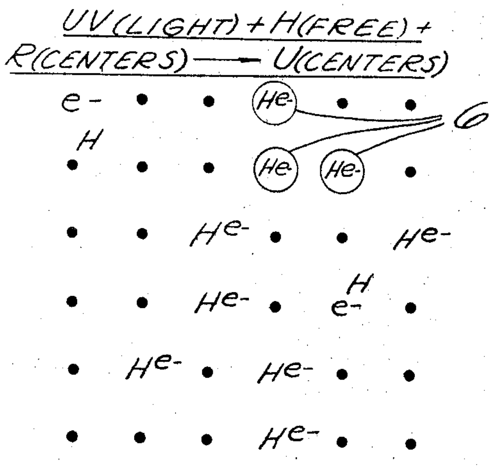

At the same time that the transformation of relationship (3) is taking place, the relationship of FIGURE 5 is also taking place. The ultraviolet light stimulates a reaction between free hydrogen in the crystal lattice and R centers to regenerate U centers 6 from the R centers and the free hydrogen. The FIGURE 5 transformation can be expressed by the relationship:

$$(4)\quad UV_{(light)}+Hydrogen_{(free)}+R_{(centers)}\rightarrow U_{(centers)}$$

Figure 6:
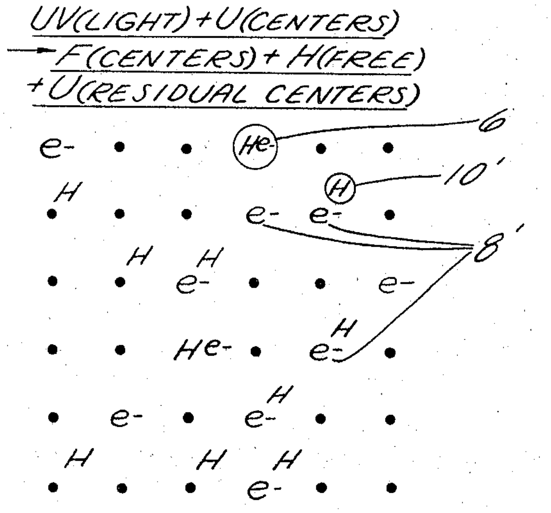

As shown in FIGURE 6, the U centers generated in the transformation of relationship (4) react further with the ultraviolet light whereby U center hydrogen is driven to interstitial positions to transform U centers into F centers by the relationship:

$$(5)\quad UV_{(light)}+U_{(centers)}\rightarrow F_{(centers)}+Hydrogen_{(free)}+U_{(residual\ centers)}$$

The transformation of relationship (5) results in a return of the ultraviolet illuminated portion of the crystal to the original characteristic color. A comparison of the crystal of FIGURE 6 with the crystal of FIGURE 2 shows that the transformation of relationship (5) returns the crystal to the FIGURE 2 state ready for a new information storage operation.

Figure 7:
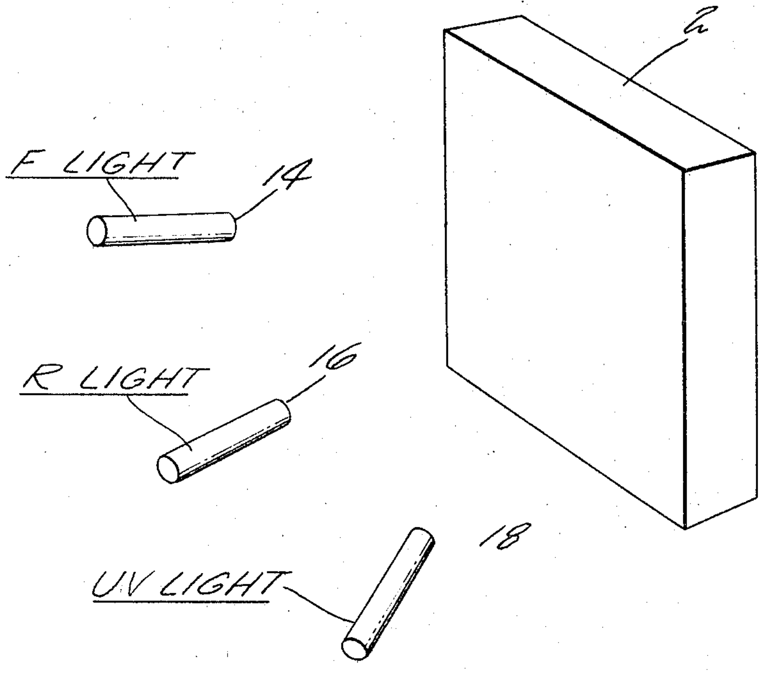
FIGURE 7 is a schematic view of a system using the present invention.

Referring to FIGURE 7, a system using the present invention is shown schematically. A preferred embodiment for crystal 2 is a composition of a solid solution of sodium chloride and sodium bromide with hydrogen, the mole percentages being 60% NaCl and 40% NaBr. For this hydrogenated crystal, the F light source could be an argon laser 14 having an output wavelength of approximately 4880 A.; the R light source could be a helium-neon laser 16 having an output wavelength of approximately 6320 A.; and the ultraviolet light source could be any ultraviolet source, such as a hydrogen discharge, having output wavelengths of approximately 2000 A. As desired, the F light from source 14 would be directed to a desired area of crystal 2 to store information by the transformation of relationship (2), R light from source 16 would illuminate the crystal or portions thereof to generate, for readout, the negative of any stored pattern, and ultraviolet light source 18 would illuminate the crystal to erase stored information.

Another example of a crystal suitable for use in this invention is hydrogenated KCl. For this crystal a source of light at approximately 5600 A., such as a mercury-helium, nitrogen or krypton gas laser, could serve as F light; a source at approximately 7300 A.; such as a mercury-helium or neon gas laser, could serve as R light; and a source at approximately 2200 A.; such as a broad spectrum hydrogen discharge lamp, could serve as ultraviolet erasing light.

While a preferred embodiment of the present invention has been shown and described, various modifications and substitutions may be made without departing from the spirit and scope of this invention. Accordingly, it is to be understood that this invention has been described by way of illustration rather than limitation.

What is claimed is:

1. The method of storing and erasing information in a crystal having color centers and hydrogen atoms therein external of said color centers, said color centers in said crystal having the capacity to group together in the presence of hydrogen in the crystal, including the steps of selectively illuminating at least part of said crystal with a first light of a selected wavelength to cause pluralities of color centers in said illuminated part to group together to form information centers representing stored information, and illuminating at least said part of said crystal with a second light of ultraviolet wavelength to reestablish color centers from information centers in said ultraviolet illuminated part to erase stored information therein.

2. The method as in claim 1 including the step of illuminating at least a selected part of said crystal with a third light of selected wavelength to interrogate said selected part, said selected part absorbing said third light at locations of information centers therein without destroying said information centers and passing said third light in the absence of information centers.

3. The method as in claim 1 wherein said crystal is a solid solution of sodium chloride and sodium bromide, and wherein said first light has a wavelength of approximately 4880 A., and said second light has a wavelength of approximately 2000 A.

4. The method as in claim 3 including the step of illuminating at least a selected part of said crystal with a third light having a wavelength of approximately 6320 A. to interrogate said selected part, said selected part absorbing said third light at locations of information centers therein without destroying said information centers and passing said third light in the absence of centers.

5. The method as in claim 3 wherein said solid solution of sodium chloride and sodium bromide in approximately 60% sodium chloride and 40% sodium bromide by mole percentages.

6. The method as in claim 1 wherein said crystal is potassium chloride, and wherein said first light has a wavelength of approximately 5600 A., and said second light has a wavelength of approximately 2200 A.

7. The method as in claim 6 including the step of illuminating at least a selected part of said crystal with a third light having a wavelength of approximately 7300 A. to interrogate said selected part, said selected part absorbing said third light at locations of information centers therein without destroying said information centers and passing said third light in the absence of information centers.

8. An information handling system comprising a crystal having color centers and hydrogen atoms therein external of said color centers, color centers in said crystal having the capacity to group together in the presence of hydrogen, means for selectively illuminating at least part of said crystal with a first light of selected wavelength to cause pluralities of color centers in said illuminated part to group together to form information centers representing stored information, and means for illuminating at least part of said crystal with a second light of ultraviolet wavelength to reestablish color centers from said information centers in said ultraviolet illuminated part to erase stored information therein.

9. An information handling system as in claim 8 including means for illuminating at least a selected part of said crystal with a third light of selected wavelength to interrogate said selected part, said selected part absorbing said third light at locations of information centers without destroying said information centers and passing said third light in the absence of information centers.

10. An information handling system as in claim 8 wherein said crystal is a solid solution of sodium chloride and sodium bromide, and wherein said first light has a wavelength of approximately 4880 A., and wherein said second light has a wavelength of approximately 2000 A.

11. An information handling system as in claim 10 including means for illuminating at least a selected part of said crystal with a third light having a wavelength of approximately 6320 A. to interrogate said selected part, said selected part absorbing said third light at locations of information centers without destroying said information centers and passing said third light in the absence of information centers.

12. An information handling system as in claim 10 wherein said solid solution of sodium chloride and sodium bromide is approximately 60% sodium chloride and 40% sodium bromide by mole percentages.

13. An information handling system as in claim 8 wherein said crystal is potassium chloride, and wherein said first light has a wavelength of approximately 5600 A., and said second light has a wavelength of approximately 2200 A.

14. An information handling system as in claim 11, including means for illuminating at least a selected part of said crystal with a third light having a wavelength of approximately 7300 A. to interrogate said selected part, said selected part absorbing said third light at locations of information centers without destroying said information centers and passing said third light in the absence of information centers.

References Cited

UNITED STATES PATENTS

| | | | |
|---|---|---|---|
| 2,481,622 | 9/1949 | Rosenthal | 350—150 X |
| 3,125,741 | 3/1964 | Kenneally | 340—173 X |

OTHER REFERENCES

Bron, W. E.: "Optical Absorption and Electron Spin Resonance After Optical and Thermal Bleaching of F Centers," Physical Review, vol. 125, No. 2, Jan. 15, 1962, pp. 509–513.

Okamoto, Fumio: "Optical Absorption of M Centers in Potassium Chloride Crystals," Physical Review, vol. 124, No. 4, Nov. 15, 1961, pp. 1090–1097.

BERNARD KONICK, *Primary Examiner.*

JOSEPH F. BREIMAYER, *Assistant Examiner.*

U.S. Cl. X.R.

88—1; 178—7.87; 313—91